United States Patent [19]
Cruise et al.

[11] Patent Number: 5,874,159
[45] Date of Patent: Feb. 23, 1999

[54] DURABLE SPUNLACED FABRIC STRUCTURES

[75] Inventors: Charles Clayton Cruise, Old Hickory; Robert Howe Peterson; James Thomas Summers, both of Hendersonville, all of Tenn.

[73] Assignee: E. I. du Pont de Nemours and Company, Wilmington, Del.

[21] Appl. No.: 642,649

[22] Filed: May 3, 1996

[51] Int. Cl.[6] .................................................. B32B 27/14
[52] U.S. Cl. ...................... 428/198; 156/291; 156/306.6; 428/360; 442/402; 442/408
[58] Field of Search ................................. 428/198, 360, 428/105, 109, 110, 113; 442/401, 402, 408, 50, 57; 156/306.6, 291

[56] References Cited

U.S. PATENT DOCUMENTS

| | | | |
|---|---|---|---|
| 2,568,144 | 9/1951 | Cremer et al. | 428/360 |
| 2,574,849 | 11/1951 | Talalay | 428/360 |
| 2,972,554 | 2/1961 | Mushat et al. | 428/360 |
| 3,329,556 | 7/1967 | Mc Falls et al. | 428/360 |
| 3,485,706 | 12/1969 | Evans et al. | 161/72 |
| 3,597,299 | 8/1971 | Thomas et al. | 161/57 |
| 3,664,905 | 5/1972 | Schuster et al. | 161/59 |
| 3,797,074 | 3/1974 | Zafiroglu | 19/156.3 |
| 4,507,351 | 3/1985 | Johnson et al. | 428/198 |
| 4,623,575 | 11/1986 | Brooks et al. | 428/113 |
| 4,944,992 | 7/1990 | Yoneshige et al. | 428/360 |
| 5,134,016 | 7/1992 | Geary et al. | 428/360 |
| 5,431,991 | 7/1995 | Quantrille et al. | 428/109 |

FOREIGN PATENT DOCUMENTS

| | | |
|---|---|---|
| 0 120 564 A2 | 10/1984 | European Pat. Off. . |
| 0 534 863 A1 | 3/1993 | European Pat. Off. . |
| 2 045 825 | 11/1980 | United Kingdom . |

*Primary Examiner*—James J. Bell

[57] ABSTRACT

This invention relates to making nonwoven fabrics which are durable for machine washing and durable for other wet and hard use or abusive applications. The inventive fabrics comprise two layers of fabric sheet bonded together at closely spaced locations where the bonding includes fibers from both fabrics thoroughly involved with the binder. The inventive fabrics retain the qualities of a spunlaced nonwoven fabric which include low cost, comfort, drapability, softness, absorbency, breathability and others while having the durability comparable to traditional knitted or woven fabrics.

26 Claims, 4 Drawing Sheets

DURABLE SPUNLACED FABRIC STRUCTURES

FIELD OF THE INVENTION

This invention relates to spunlaced fabrics and particularly to spunlaced fabrics suitable for durable uses and reuses.

BACKGROUND OF THE INVENTION

E. I. du Pont de Nemours and Company (DuPont) has been making and selling Sontara® spunlaced fabrics for a number of years. Such spunlaced fabrics have a multitude of uses such as medical gowns and drapes, absorbent wipers and durables such as window shades and interlinings for apparel. Sontara® spunlaced fabrics are successfully marketed because of their low cost in use and valuable attributes such as texture, softness, comfort, drapability and absorbency.

Spunlaced fabrics are made by hydroentangling webs of fibers with high energy water jets as basically described in Evans et al. U.S. Pat. No. 3,485,706. The webs may be made of a variety of fibers such as polyester, rayon, cellulose (cotton and wood pulp), acrylic, and other fibers as well as some blends of fibers. The fabrics may be further modified to include antistatic and antimicrobial properties, etc. by incorporation of appropriate additive materials into the fiber or fiber webs. However, one limitation of spunlaced fabrics and nonwovens in general is durability through multiple launderings. Thus, spunlaced fabrics have not been acceptable for most uses in apparel and garments except for single use garments such as medical gowns and limited use protective apparel.

Hydroentangling creates an impressively strong fabric at much lower cost than weaving and knitting. Unfortunately, the cyclic working in a typical washer ravages the entangled fibers and effectively destroys the fabric for its intended purpose as fibers are disentangled. After a single laundering, the fabric may tend to have a noticeably poorer appearance such as a pilling or "worn" look or possibly may be destroyed. Within a few launderings, ordinary spunlaced fabrics are almost always useless for their intended purpose. The fabric has the appearance that it has been shredded.

In one approach to create durability in spunlaced fabrics, DuPont has addressed this problem by a stitch pattern introducing thread into the fabric forming a stitchbond structure. The filament or staple yarns are "knit" in a dense pattern into the fabrics and are quite resistant to the cyclic tensioning or working of the fabric. Thus, the laundered stitchbond fabric does not suffer as much of the damages seen with the ordinary un-reinforced spunlaced fabrics. The stitched structure has proven to be reasonably satisfactory in performance for durable and reusable mattress covers and withstands many hundreds of launderings. However, there are aesthetic and cost considerations of the stitched appearance that could make such a solution unattractive.

Others have attempted to create a durable nonwoven by adding bonding agents to the fabrics. The bonding agents tend to make the resulting fabrics quite stiff. Actually, it seems to take more bonding agent to make the fabrics durable than it does to make them stiff. Clearly, stiffness is not a desirable quality for a number of uses such as for apparel and home furnishings. A second problem with binders is that they often extend to the surface which creates a couple of undesirable consequences. The binders tend to be very hard after they are cured and any place that it extends through to the surface will be noticeable to the touch. It will feel like a pebble or similar structure which would be quite irritating. The second problem is that the binders often do not respond to dyes and printing like the fibers in the fabric. As such, the binder becomes noticeable and unsightly.

Clearly, it would be very desirable to be able to make and use nonwoven fabrics that are durable to withstand numerous launderings or similar abuse while having the qualities available from spunlaced fabrics.

SUMMARY OF THE INVENTION

It has now been found that a durable fabric may be formed by bonding two layers of fabric together to form a composite fabric structure having the feel and appearance of a conventional spunlaced fabric sheet, but with significantly improved durability. The composite fabric structure comprises two layers of fabric bonded together such that the bonding is done with discrete bonding points between the layers and relatively closely spaced to one another. In particular, the bonds encompass portions of fibers from both layers of fabric without substantially penetrating through to the outer surface of at least one of the layers of fabric.

It is a further aspect of the present invention that a single layer durable nonwoven fabric may be formed by providing closely spaced, discrete globules pressed into fibers of the nonwoven fabric.

BRIEF DESCRIPTION OF THE DRAWINGS

The invention will be more easily understood by a detailed explanation of the invention including drawings. Accordingly, drawings which are particularly suited for explaining the invention are attached herewith; however, it should be understood that such drawings are for explanation only and are not necessarily to scale. The drawings are briefly described as follows.

DETAILED DESCRIPTION OF THE PREFERRED EMBODIMENT

Figure 1:
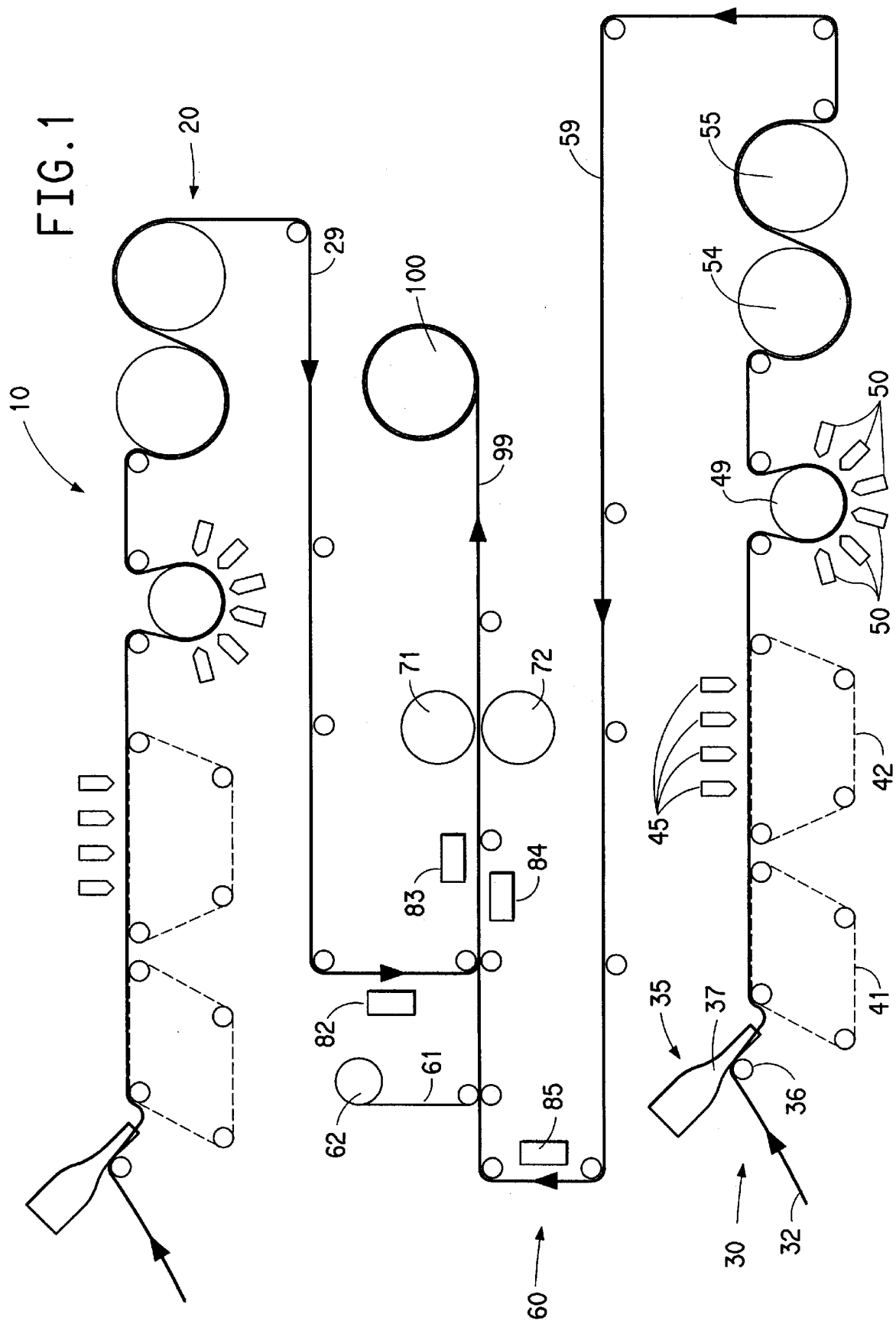
FIG. 1 shows a highly schematic arrangement of the manufacturing process for making the fabric of the present invention.
Figure 2:
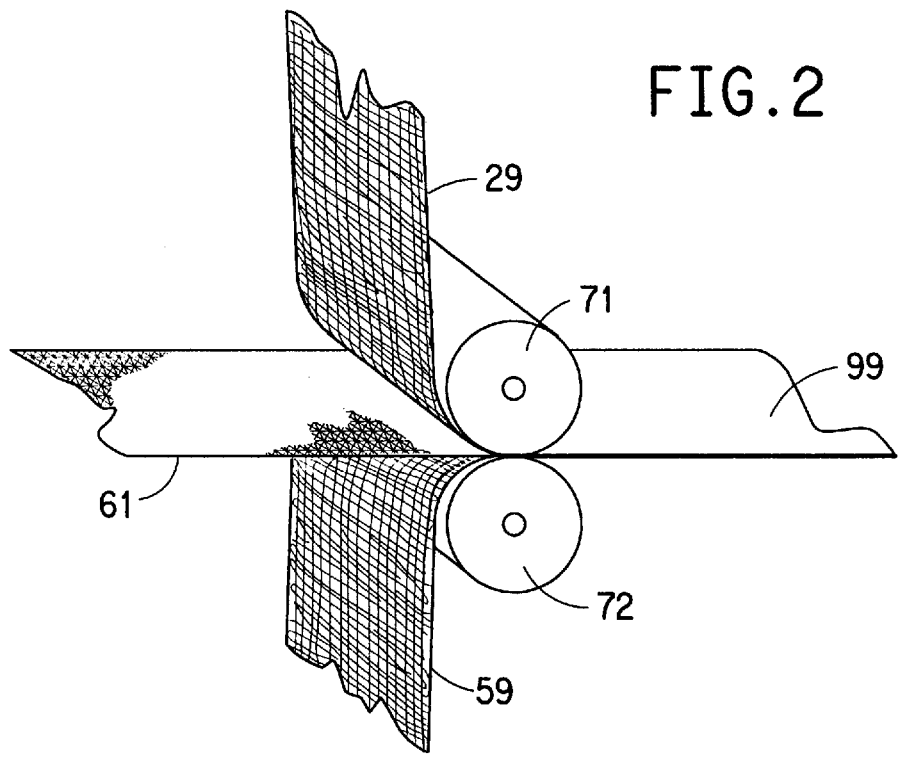
FIG. 2 is an enlarge fragmentary perspective view of the calender rolls for forming the composite fabric of the present invention.

Referring now to FIG. 1 of the drawings, the equipment for making the composite fabrics of the present invention is generally indicated by the number 10. FIG. 1 is a highly schematic drawing intended to convey the generally understanding of the equipment and process while not overloading the drawing will detail.

The preferred process essentially comprises three generally separate steps which are shown in sequence in FIG. 1. The first step is the creation of two separate hydroentangled sheets by first and second fabric forming lines generally indicated by the reference numbers 20 and 30 at the upper and lower portions of the drawing. The process of forming hydroentangled sheets is generally described in Zafiroglu et al., U.S. Pat. No. 3,797,074 and Evans et al., U.S. Pat. No.

3,485,706 and which are incorporated herein by reference. Focusing on the second fabric forming line 30, the process comprises feeding a batt of fiber 32 to an airlay 35. The airlay 35 includes a toothed disperser roll 36 that rotates at high speed relative to the feed rate of the batt 32. The fiber is pulled out of the batt 32 by the disperser roll 36 and fed into an air flow in the nozzle 37. The fiber is collected on a consolidation screen belt 41. The fiber on the belt 41, now generally referred to as a web, is carried onto a second belt 42 suited for supporting the web under a series of high energy water jets generally indicated by the number 45. The high energy water jets entangle the fibers forming a fabric. Typically, the fabrics are subjected to hydroentangling from the underside by conveyance around a roll 49 so as to be impinged by a second series of high energy water jets 50. The fabric is thereafter dried by suitable equipment such as the steam heated rolls 54 and 55 to produced a base fabric 59.

Both the first and second fabric lines 20 and 30 are essentially similar, producing base fabrics 29 and 59, respectively. It is preferred that the base fabrics are collected on a roll at the end of each line 20 and 30 so that production rates of each line 20, 30 and the composite assembly line 60 (described below) may be optimized and the lines can be operated independently for maximum up time.

Figure 3:
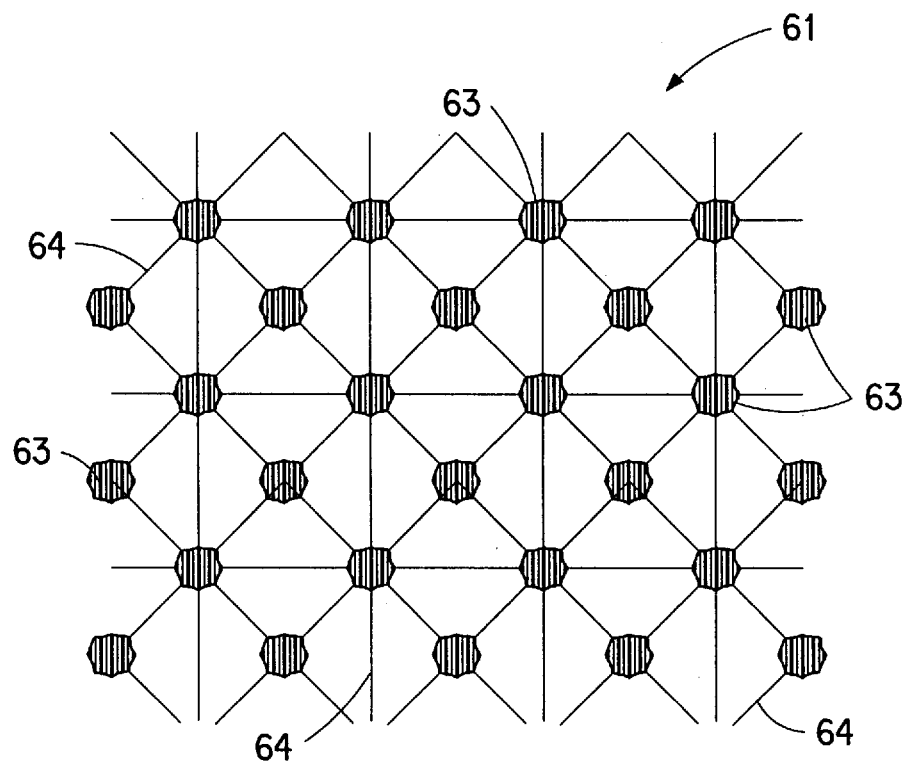
FIG. 3 is an enlarged fragmentary top view of the scrim used to create the bonds in the composite fabric.

Turning now to the process of combining the layers of fabrics together, a composite assembly line in the middle of FIG. 1 is generally indicated by the number 60. The based fabric 59 is provided into the composite assembly line 60 and a mesh bonding layer 61 of a thermoplastic netting is provided thereon from a supply roll 62. The mesh bonding layer 61 is illustrated in FIG. 3 and comprises a very fine netting like material with dots 63 at the interconnections of thermoplastic material. The fine strands 64 of thermoplastic material hold the mesh bonding layer together and effectively dictates the spacing of the bonding points of the composite fabric 99 or netting together. In the preferred arrangement, the dots 63 are smaller than a millimeter in diameter and about one (1) millimeter from adjacent dots 63. The fine strands 64 are quite small, being a few microns in thickness. Such materials are utilized commercially in medical and automotive products, from Smith and Nephew, Ltd. and Applied Extrusion Technologies as well as other sources.

The second base fabric 29 is laid over top of the mesh bonding layer 61 forming a sandwich with fabrics 29 and 59 on the top and bottom thereof. The sandwich is then subjected to calendering between calender rolls 71 and 72 under controlled temperature, pressure and speed to melt the thermoplastic material in the mesh bonding layer 61. By surface tension of the molten thermoplastic material, the dots 63 of the mesh bonding layer 61 form discrete globules 65 (see FIG. 5) of binder such that the fine connecting strands 64 between the dots 63 are severed and the material therein largely retracts into the globules 65. At the same time the pressure of the calender rolls 71 and 72 force a substantial portion of the fibers of the base fabrics into the globules such that the binder encases or encompasses a plurality of the fibers in each of the base fabrics at some point.

Figure 5:
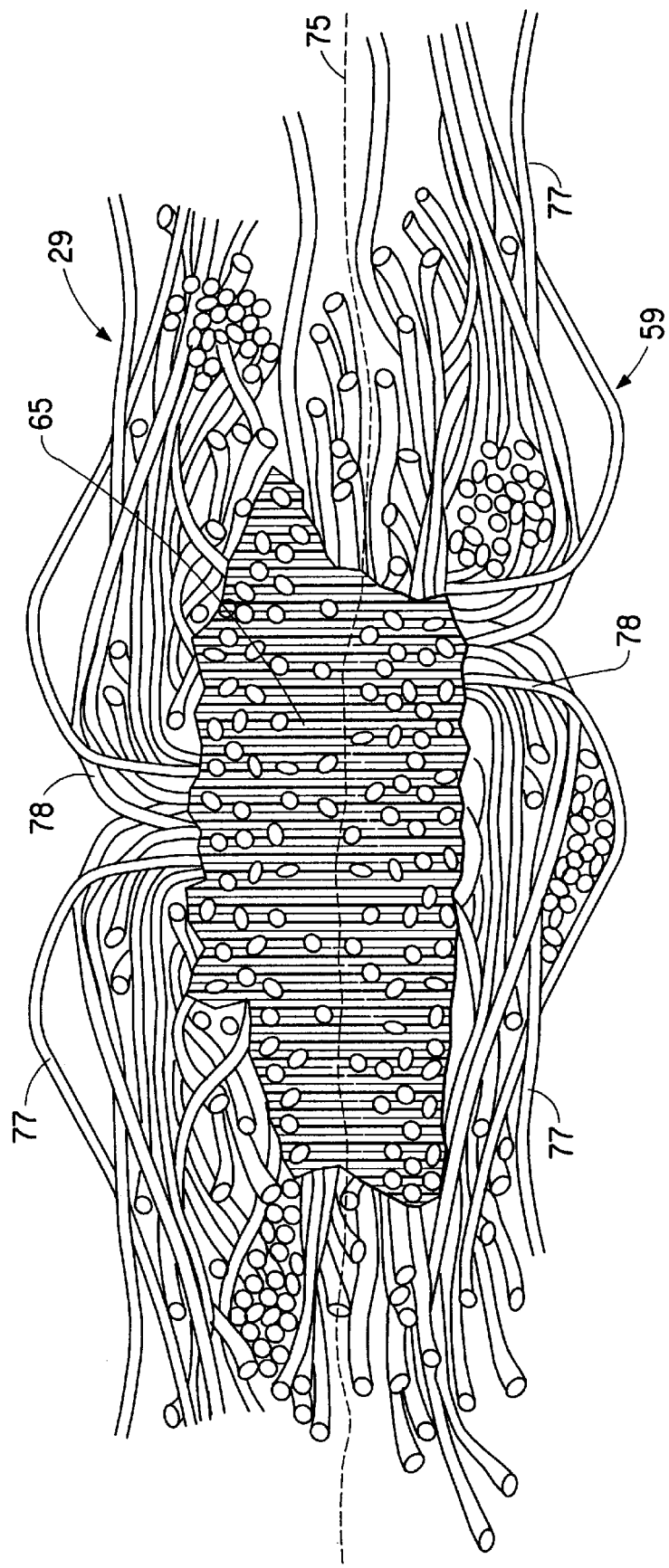
FIG. 5 is a cross sectional view of the composite fabric of the present invention showing a single bonding point.

Referring now particularly to FIG. 5, the construction of the composite fabric may be more clearly understood. A dotted line 75 is provided to show the interface between the two layers of base fabric 29 and 59. Each of the base fabrics are made up of a great number of individual fibers 77. The fibers are randomly arranged in the fabrics 29 and 59, however, it is generally known that the fibers preferentially lay flat in the web prior to hydroentangling. The fibers are described as having an X-Y orientation. After the fabric has been hydroentangled, some of the fibers are pushed through the fabric to have a Z component extending up and down in the fabric. The Z component fibers are tangled into and with the X-Y fibers which continue to comprise a majority of the fibers, forming the stable and strong hydroentangled fabric. As seen in FIG. 5, some fibers 78 have a portion which extend in the Z direction though the fiber is longer than the Z direction thickness of the fabric. Thus, the fibers are not necessarily entirely vertically or Z oriented. It should also be seen that some of the Z fibers 78 are also enmeshed or encompassed into the globule 65 of binder. It is believed that this interaction of Z fibers 78 being caught and held by the globules 65 of adhesive provides the strongest contribution toward durability that hydroentangled fabrics have not possessed until this time. However, the durability benefits may not be entirely the enmeshing of the Z direction fibers but more simply the enmeshing of so many fibers. Certainly, it is believed that enmeshing Z direction fibers into the globules forms the most durable fabrics, but it may be within the scope of the invention simply to have at least one nonwoven fabric having a plurality, closely spaced, but discrete bonding points where the bonds includes enmeshing or encompassing fibers in the nonwoven fabric.

Several other observations about the globules and fibers 77 and 78 worth discussing are that the globule 65 is within the fabric and does not extend to the surface. Thus, the composite fabric surface retains the softness and appearance characteristics of the base fabric constituted by fibers 77. Secondly, the globule 65 preferably encase or surround on at least half of the surface of fibers 77 that are at least one fiber thickness from the boundary between the two base fabrics. In the drawing and in the preferred embodiment, fibers 77 several fiber thicknesses from the boundary are encased in the globules 65 of binder. This deep fiber bonding is a result of the substantial pressure employed by the calender rolls. The extent of involvement of the fibers in the globules may also be described as the percentage of the thickness of each base fabric which is involved with the globules 65. For example, it is preferred that the globules not extend through 100% of the base fabric because this would mean that the adhesive extends to the surface of the composite fabric. However, 80% to 90% penetration may be quite acceptable. At the other end, it is preferred that about 10% or more of the base fabric is involved in the globule although the scope of the invention is related to the amount that makes the composite fabric durable.

A further observation is that it is also important that the connections between adjacent globules are substantially broken or nonexistent. The inventive fabrics tend to exhibit harsher qualities after calendering and before washing. Once the inventive fabric is laundered, it expands in thickness after being tightly compressed and exhibits softness and drapability qualities comparable to conventional spunlaced fabrics. If the globules were substantially interconnected, they would tend to make the composite fabric stiffer. The discrete bonding points do not make a continuous film layer in the middle of the fabric but are in discrete globules that neither connect with each other nor penetrate to the surface of the fabric. The surface layers, while hydroentangled enough to interconnect the filaments and maintain surface integrity and strength are, nonetheless free to move enough to give a soft, drapable, flexible material, particularly after washing or mechanical action.

It should be noted that the two base fabrics may be similar or quite different. The base fabrics may differ in basis weight or in fiber composition, construction or a combination of differences. The potential binders for the base layers of fabric may be polyethylene, polyamide, polyester, polypropylene and polyvinyl alcohol as well as other potential adhesives. It is preferred that the adhesives be in a thermoplastic state so that the globules may be controlled while being pressed by calender rolls or other arrangement for compressing the base fabrics together.

Figure 4:
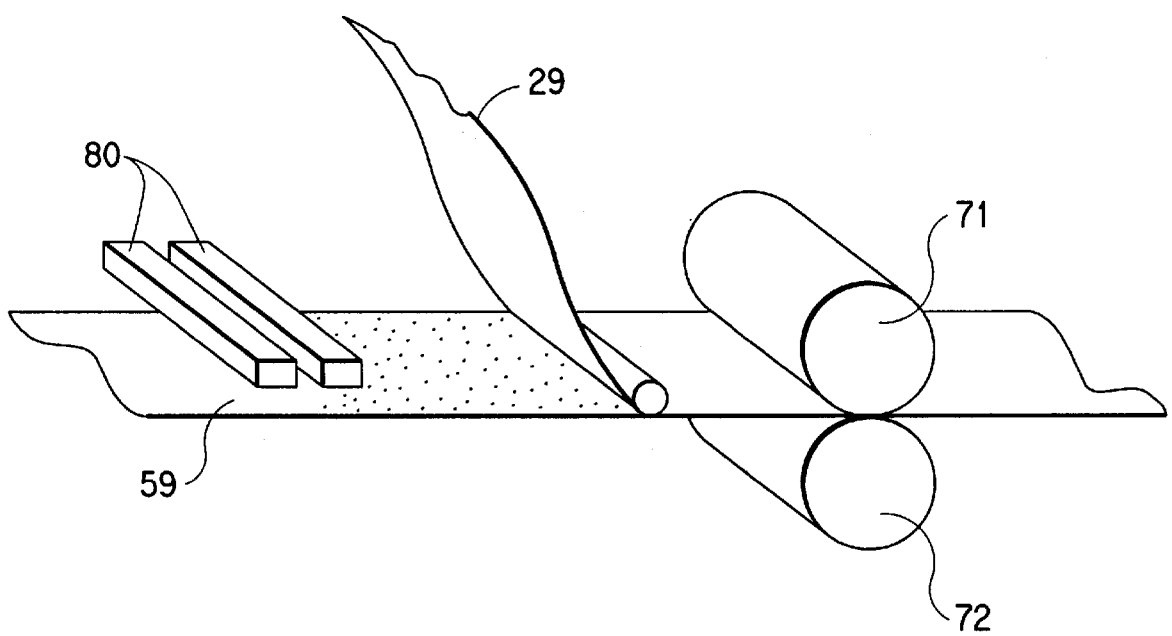
FIG. 4 is a fragmentary perspective view similar to FIG. 2 showing a second arrangement for forming the composite fabric structure of the present invention.

While it is preferred that the binder be applied in the form of a mesh bonding layer 61, it has been found that it may be applied directly to the underlying base fabric. Referring to FIG. 4, there is shown a simple series of adhesive applicators 80 which apply a small amount of binder to the fabric 59. The small amount of binder are called drops and form globule type bonds in a manner similar to the dots of the mesh bonding layer 61. The arrangement of the drops may not be as uniformly distributed as the dots are in a mesh, it is believed that the distribution may be close enough to obtain satisfactory lamination while maintaining discrete bonding points or positions to provide the other desirable characteristics.

The size of the globules is preferably selected or defined so that the adhesive encompasses fibers from both layers of fabric but does not "bleed" through to either surface of the durable fabric. The term globule is meant to describe the adhesive material in the fabric which are probably not spherical. Actually, the globules are quite amorphous being generally flatter and wider because of the nip pressure. It is noted that in some applications where one side of the fabric may be concealed or shielded, the adhesive may be permitted to extend to the surface of that side. However, it is suggested that one of the qualities of the inventive fabric is that the adhesive is not very perceptible at the surface of either side. Thus, the upper limit on the size of the globules is probably limited by the thickness of the fabric and the lower limit is related to the ability to get the adhesive to encompass fibers in each of the fabric layers. In most cases the globules will be less than 2 millimeters in diameter and often less than a single millimeter.

Another consideration of the dots or globules is the spacing. It is believed that the best results when the globules are spaced close to one another. However, it is recognized that a suitable composite fabric may be formed having greater durability than ordinary nonwoven fabrics when the globules are spaced considerably further apart than is preferred. For example, it may be suitable to space the globules so that there is a four to five millimeter spacing between the globules and perhaps greater spacing is possible. However, such spacing may suggest or require large globules that will penetrate substantially through the thickness of the fabric. Thus, the fabric layers may be quite thick in such circumstances or the adhesive may extend to the surface. In the preferred arrangement, the spacing is about 2 millimeters or less and more preferably about one millimeter or less.

The activation of the adhesive requires a balance of several considerations. For example, the speed at which the fabrics may be run through the nip will depend of the melting temperature of the adhesive, the temperature of the heated roll, and the pressure at the nip. Other factors may affect the bonding including hardness of the pressure roll, the diameter of the rolls. The adhesive in the dots or globules is preferably activated by heated roller regardless of how the dots are applied to the fabrics.

Another option with the system to perhaps speed the manufacturing process would be to preheat one or both fabrics so that the calender rolls do not have to heat the fabric from ambient temperature. The calender rolls 71 and 72 are arranged so that the lower roll is heated by hot oil or other source of heat and the upper roll 71 provides pressure down onto the heated roll 72. Thus, it is preferred to heat the upper base fabric 29 which is furthest remote from the heated roll. However, the preheaters may be placed in a variety of potential locations as indicated by the numbers 82, 83, 84, and 85 or in any combination that is found acceptable. It has been found that preheating the mesh bonding layer 61 has not been very satisfactory as it tends to melt unevenly and without the two fabrics to hold the dots in place could leave portions without the globules or bonds.

It should also be noted that hydroentangling is not the only nonwoven technology that would benefit by the present invention. Needle punched fabrics which have Z fiber direction arranged by a physical needle punched into a web of randomly oriented fiber also work well within the scope of the present invention.

It should also be noted that in some cases it may be desirable under the present invention to bond a nonwoven a woven or knit fabric or material made in accordance with technology other than spunlaced or needle punched technology. For example, it may be desired to have a lightweight knitted fabric combined with a low cost, heavier weight spunlaced fabric as backing for thickness or softness. By securing the woven to the nonwoven such that discrete globules of adhesive encase sufficient portions of the fibers from the spunlaced or needle punched nonwoven fabric, the resulting fabric will be durable to multiple launderings.

The following is a more detailed description of a sample of the inventive fabric: A layer of meltable thermoplastic web or mesh such as Delnet® meltable polyethylene web (weight range of 0.2–1.0 oz/yd$^2$ or 6.8–33.9 g/m$^2$ with a preferred range of 0.3–0.5 oz/yd$^2$ or 10.2–17.0 g/m$^2$) is laid between two layers of spunlaced fabric. The fabric layers should be at least 0.6 oz/yd$^2$ (20.3 g/m2) up to about 5 oz/yd$^2$ (170 g/m$^2$) for the heated roll contact fabric or up to 8 oz/yd$^2$ (271 g/m$^2$) for the non "preheated" fabric. The preferred range is about 0.9–4.0 oz/yd$^2$ (30.5–136 g/m$^2$). The two fabric layers may consist of cellulosics like rayon or lyocell or thermoplastics like polyester or polyamide or blends as desired to create specific sets of properties. A preferred blend has been lyocell and Microsafe(TM) acetate which gives a permanently antimicrobial absorbent comfort layer.

The adhesive mesh layer must be sufficiently lower melting than the surface layers to enable reasonable process speeds at a temperature that will not damage the surface layers. It can be, but is not limited to, a condensation polymer or copolymer such as polyamides or polyesters or an addition polymer such as polyethylene or vinyl copolymers. Scrim and surface layer polymers can be selected for reasonable surface energy compatibility to ensure proper adhesion, but with good physical interlock, it is not necessary. It is conceivable to form the globules of the present invention using a punctured or apertured film that under the application of heat would cause discrete bonding points to form. There are probably other techniques that could be used to form the globules.

The surface fabrics are preferably needled such as by hydroentangling or needle punch, to impart a significant amount of "Z" directionality to the fabrics so that many fibers in the layer are present on both surfaces and fastening them on the inside surface of the layer with the scrim polymer provides stability for the outside surface. Other means of web forming for nonwovens result in almost all of the fibers being in the plane of the fabric and not available to hold the outside to the inside.

Bonding is preferable achieved by use of a heated pressure calender. The preferred temperature range is from a low of 300 degrees F. (149 degrees C.) to enable reasonable process speed to a high of about 450 degrees F. (232 degrees C.) for thermoplastics like polyesters to about 550 degrees F. (288 degrees C.) for cellulosics. Pressures should be sufficient to extrude the molten scrim polymer into the surface layers to an extent that will encapsulate a reasonable number of fibers but will not exude to the surface.

A number of samples have been prepared and characterized in Tables I–VIII below. The example fabrics have been prepared essentially as described below.

EXAMPLE 1

Example 1 comprises two layers of spunlaced hydroentangled fabric made of 70% lyocell and 30% acetate having a nominal basis weight of 68 g/m$^2$ (2.0 oz/yd$^2$) and bonded together with a 17 g/m$^2$ (0.51 oz/yd$^2$) mesh product comprising small connected polyethylene dots. The product is available as X530 web from Applied Extrusion Technologies of Middletown, Del. The adhesive is set by a heated calender roll. The fabric is run at 6.4 m/min (7 ypm) through a nip at 165 pounds per linear inch (pli) pressure with the heated roll at 211° C. (411° F.) and the pressure roll have a hardness of 90 on a Shore 80 scale. The pressure roll had a diameter of 12 inches and the heated roll had a diameter of 9.75 inches.

EXAMPLE 2

Example 2 comprises two layers of spunlaced hydroentangled fabric made of 100% lyocell and having a nominal basis weight of 78 g/m$^2$ (2.3 oz/yd$^2$) and bonded with a 17 g/m$^2$ polyethylene mesh product as described in Example 1. The adhesive is set by a heated calender roll. The adhesive was set by the same equipment and conditions as in Example 1 but at 209° C. (409° F.) and at 132 pli pressure.

EXAMPLE 3

Example 3 comprises two layers of spunlaced hydroentangled fabric made of 100% lyocell and having a nominal basis weight of 32 g/m$^2$ (0.95 oz/yd$^2$) bonded with a 17 g/m$^2$ polyethylene mesh product as described in Example 1. The adhesive is set by a heated calender roll. The adhesive was set by the same equipment and conditions as in Example 2 but at 21.5 m/min (23.5 ypm) and 218° C. (424° F.).

EXAMPLE 4

Example 4 comprises two layers of spunlaced hydroentangled fabric where one layer is 100% lyocell having a nominal basis weight of 78 g/m$^2$ (2.3 oz/yd$^2$) and the second layer is 100% polyester having a nominal basis weight of 68 g/m$^2$ (2.0 oz/yd$^2$) The bonding between is accomplished by depositing small globules of polyamide adhesive with metered jets at close intervals. The adhesive is set by a heated calender roll. The adhesive was set by the same equipment and conditions as in Example 2 but at 6.4 m/min (7 ypm) and 172° C. (342° F.).

EXAMPLE 5

Example 5 comprises two layers of spunlaced hydroentangled fabric where one layer is 100% lyocell at 32 g/m$^2$ (0.95 oz/yd$^2$) nominal basis weight and the second layer is 100% polyester having a basis weight of 34 g/m$^2$ (1.0 oz/yd$^2$). The bonding between is accomplished by depositing small globules of polyamide adhesive with metered jets at close intervals. The adhesive is set by a heated calender roll. The adhesive was set by the same equipment and conditions as in Example 2 but at 12.8 m/min (14 ypm).

EXAMPLE 6

Example 6 comprises two layers of spunlaced hydroentangled 100% lyocell each having a nominal basis weight of 78 g/m$^2$ (2.3 oz/yd$^2$). The bonding between is accomplished by depositing small globules of polyamide adhesive with metered jets at close intervals. The adhesive is set by a heated calender roll. The adhesive was set by the same equipment and conditions as in Example 2 but at 12.8 m/min (14 ypm) and 169° C. (336° F.).

EXAMPLE 7

Example 7 comprises a first layer of spunlaced hydroentangled 100% lyocell having a nominal basis weight of 78 g/m$^2$ (2.3 oz/yd$^2$) and a second layer of spunlaced hydroentangled 100% polyester having a basis weight of 34 g/m$^2$ (1.0 oz/yd$^2$). The bonding between the layers is accomplished by depositing small globules of polyamide adhesive with metered jets at close intervals. The adhesive is set by a heated calender roll. The adhesive was set by the same equipment and conditions as in Example 2 but at 9.1 m/min (10 ypm) and 172° C. (342° F.).

EXAMPLE 8

Example 8 comprises two layers of spunlaced hydroentangled 100% polyester each having a basis weight of 34 g/m$^2$ (1.0 oz/yd$^2$). The bonding between the layers is accomplished by depositing small globules of polyamide adhesive with metered jets on one layer at close intervals. The adhesive is set by a heated calender roll. The adhesive was set by the same equipment and conditions as in Example 2 but at 12.8 m/min (14 ypm) and 169° C. (336° F.).

Description of Test Methods Used

Basis Weight, Thickness and Tensile (Grab Strength and Elongation) measurements are based on ASTM D1117 measurement methods.

Wet Grab Strength and Elongation are the same as above except the fabric is wetted prior to measurement.

The Absorbent Capacity and Rate are measured using a Gravimetric Absorbency Tester (GATS), which is available from M&K Systems, wherein the fabric is under an approximately 350 kg per square meter load. In essence, the GATS measures the amount of liquid and rate at which it is absorbed through an orifice in the equipment. The T50 time is the time for the fabric to take half of its total uptake of water. The rate at T50 is the slope of the absorption curve at time T50.

Intrinsic absorbence is a measurement of the amount of water the fabric will absorb as a percentage of the weight of the fabric. Samples of the fabric are fully immersed in water and allowed to drain for approximately one minute. The difference in the dry and wet weight of the sample is divided by the dry weight of the sample and then multiplied by 100 so as to be expressed as a percentage.

Wick Rate is measured by the INDA STM 10.1 method.

Handleometer measurements are made on an instrument by the Thwing-Albert Instrument Co. of Philadelphia. The measurements are the force in grams to push a 100 mm wide fabric into a slot which is 100 mm wide. This is a quantitative measure of drapability. The Handleometer data includes data from both the top and bottom of the fabrics.

In all the tables below, the numbers accumulated are based on several tests. Thus, the data is presented as the mean and standard deviation with a slash between. Thus, the presentation is: mean/std. dev.

TABLE I

| Measurement | Example 1 Unwashed | Example 1 Washed |
|---|---|---|
| Basis Weight (g/m$^2$) | 167/9.2 | 202/9.5 |
| Thickness (mm) | 0.54/0.022 | 1.70/0.097 |
| Machine Direction Grab Strength (N) | 402/32 | 367/24 |
| Cross Direction Grab Strength (N) | 230/8.0 | 214/12 |
| Machine Direction Elongation (%) | 20.5/1.5 | 35.2/1.7 |
| Cross Direction Elongation (%) | 59.1/5.2 | 72.3/7.2 |
| Wetted Machine Direction Grab Strength (N) | 303/11 | 285/21 |
| Wetted Cross Direction Grab Strength (N) | 180/6.2 | 164/9.8 |
| Wetted Machine Direction Elongation (%) | 24.2/1.7 | 33.8/2.2 |
| Wetted Cross Direction Elongation (%) | 64.6/4.3 | 67.8/4.6 |
| Gravimetric Absorbency Test (%) | 246/9 | 421/15 |
| T50 Elapsed Time Absorbency Test (seconds) | 8.5/0.8 | 4.3/0.5 |
| Absorbency Rate at T50 (g/g/second) | 0.15/0.01 | 0.49/0.06 |
| Intrinsic Absorbency (%) | 316/6 | 525/6 |
| Wick Rate (seconds) | 486/20 | 3.4/0.1 |
| Machine Direction Handleometer (g) | 543 | 120 |
| Cross Direction Handleometer (g) | 120 | 20 |

TABLE II

| Measurement | Example 2 Unwashed | Example 2 Washed |
|---|---|---|
| Basis Weight (g/m$^2$) | 176/6.4 | 202/9.2 |
| Thickness (mm) | 0.625/0.025 | 1.71/0.074 |
| Machine Direction Grab Strength (N) | 385/62 | 344/21 |
| Cross Direction Grab Strength (N) | 306/26 | 274/14 |
| Machine Direction Elongation (%) | 20.6/4.6 | 36.6/1.6 |
| Cross Direction Elongation (%) | 59.4/4.1 | 72.4/5.7 |
| Wetted Machine Direction Grab Strength (N) | 306/17 | 291/33 |
| Wetted Cross Direction Grab Strength (N) | 239/16 | 233/20 |
| Wetted Machine Direction Elongation (%) | 25.9/1.2 | 33.3/3.4 |
| Wetted Cross Direction Elongation (%) | 61.8/3.4 | 66.3/1.6 |
| Gravimetric Absorbency Test (%) | 277/8 | 466/30 |
| T50 Elapsed Time Absorbency Test (seconds) | 5.8/0.4 | 5.0/0.6 |
| Absorbency Rate at T50 (g/g/seconds) | 0.24/0.02 | 0.48/0.07 |
| Intrinsic Absorbency (%) | 344/13 | 598/26 |
| Wick Rate (seconds) | 3.7/0.1 | 4.1/0.2 |
| Machine Direction Handleometer (g) | 653 | 177 |
| Cross Direction Handleometer (g) | 204 | 77 |

TABLE III

| Measurement | Example 3 Unwashed | Example 3 Washed |
|---|---|---|
| Basis Weight (g/m$^2$) | 93.3/2.7 | 103/1.7 |
| Thickness (mm) | 0.366/0.013 | 1.04/0.028 |
| Machine Direction Grab Strength (N) | 205/10 | 159/7.6 |
| Cross Direction Grab Strength (N) | 133/8.5 | 112/9.8 |
| Machine Direction Elongation (%) | 16.6/1.5 | 27.3/1.4 |
| Cross Direction Elongation (%) | 54.9/5.0 | 63.1/5.7 |
| Wetted Machine Direction Grab Strength (N) | 156/9.3 | 150/8.0 |
| Wetted Cross Direction Grab Strength (N) | 102/5.8 | 100/10 |
| Wetted Machine Direction Elongation (%) | 20.6/1.3 | 26.7/1.3 |
| Wetted Cross Direction Elongation (%) | 59.2/4.1 | 59.8/3.3 |
| Gravimetric Absorbency Test (%) | 291/9 | 456/25 |
| T50 Elapsed Time Absorbency Test (seconds) | 6.5/1.5 | 3.8/0.4 |
| Absorbency Rate at T50 (g/g/seconds) | 0.23/0.06 | 0.60/0.08 |
| Intrinsic Absorbency (%) | 378/4.9 | 604/46 |
| Wick Rate (seconds) | 4.9/0.9 | 5.8/1.2 |
| Machine Direction Handleometer (g) | — | — |
| Cross Direction Handleometer (g) | — | — |

TABLE IV

| Measurement | Example 4 Unwashed | Example 4 Washed |
|---|---|---|
| Basis Weight (g/m$^2$) | 163/11 | 160/11 |
| Thickness (mm) | 0.605/0.030 | 1.62/0.21 |
| Machine Direction Grab Strength (N) | 423/12 | 400/14 |
| Cross Direction Grab Strength (N) | 260/31 | 242/15 |
| Machine Direction Elongation (%) | 28.8/1.4 | 36.0/2.6 |
| Cross Direction Elongation (%) | 88.5/4.5 | 94.5/6.6 |
| Wetted Machine Direction Grab Strength (N) | 343/16 | 378/11 |
| Wetted Cross Direction Grab Strength (N) | 207/25 | 223/30 |
| Wetted Machine Direction Elongation (%) | 33.3/2.4 | 39.8/1.1 |
| Wetted Cross Direction Elongation (%) | 94.0/8.5 | 50.1/6.8 |
| Gravimetric Absorbency Test (%) | 234/7 | 424/14 |
| T50 Elapsed Time Absorbency Test (seconds) | 6.4/0.3 | 4.2/0.4 |
| Absorbency Rate at T50 (g/g/second) | 0.18/0.01 | 0.51/0.05 |
| Intrinsic Absorbency (%) | 328/21 | 560/1 5 |
| Wick Rate (seconds) | 3.6/0.1 | 3.7/0.2 |
| Machine Direction Handleometer (g) | 240.5 | 122 |
| Cross Direction Handleometer (g) | 57.5 | 27.5 |

TABLE V

| Measurement | Example 5 Unwashed | Example 5 Washed |
|---|---|---|
| Basis Weight (g/m$^2$) | 167/9.2 | 202/9.5 |
| Thickness (mm) | 0.356/0 | 0.907/0.038 |
| Machine Direction Grab Strength (N) | 214/14 | 214/12 |
| Cross Direction Grab Strength (N) | 125/3 | 125/8.9 |
| Machine Direction Elongation (%) | 25.1/1.3 | 27.8/2.2 |
| Cross Direction Elongation (%) | 74.8/0.7 | 83.0/8.8 |
| Wetted Machine Direction Grab Strength (N) | 184/16 | 216/11 |
| Wetted Cross Direction Grab Strength (N) | 106/6.7 | 116/5.8 |
| Wetted Machine Direction Elongation (%) | 29.6/2.3 | 32.3/0.8 |
| Wetted Cross Direction Elongation (%) | 84.2/2.7 | 90.0/8.0 |
| Gravimetric Absorbency Test (%) | 212/10 | 435/19 |
| T50 Elapsed Time Absorbency Test (seconds) | 5.1/0.5 | 4.3/0.5 |
| Absorbency Rate at T50 (g/g/seconds) | 0.21/0.03 | 0.50/0.06 |
| Intrinsic Absorbency (%) | 360/12 | 537/22 |
| Wick Rate (seconds) | 5.8/0.2 | 4.6/0.3 |
| Machine Direction Handleometer (g) | 62 | 32 |
| Cross Direction Handleometer (g) | 16 | 9 |

TABLE VI

| Measurement | Example 6 Unwashed | Example 6 Washed |
|---|---|---|
| Basis Weight (g/m$^2$) | 167/9.2 | 202/9.5 |
| Thickness (mm) | 0.716/0.048 | 2.77/0.30 |
| Machine Direction Grab Strength (N) | 326/14 | 240/12 |
| Cross Direction Grab Strength (N) | 257/16 | 197/11 |
| Machine Direction Elongation (%) | 28.1/1.4 | 48.6/2.5 |
| Cross Direction Elongation (%) | 70.3/3.4 | 73.8/4.8 |
| Wetted Machine Direction Grab Strength (N) | 289/12 | 230/16 |
| Wetted Cross Direction Grab Strength (N) | 199/5.9 | 204/5.9 |
| Wetted Machine Direction Elongation (%) | 35.0/0.7 | 45.8/3.3 |
| Wetted Cross Direction Elongation (%) | 71.5/0.6 | 72.4/1.3 |
| Gravimetric Absorbency Test (%) | 361/17 | 676/21 |
| T50 Elapsed Time Absorbency Test (sec) | 6.6/0.6 | 5.0/0.5 |
| Absorbency Rate at T50 (g/g/sec) | 0.28/.04 | 0.68/0.06 |
| Intrinsic Absorbency (%) | 544/23 | 1008/51 |
| Wick Rate (sec) | 3.0/0.4 | 3.5/0.1 |
| Machine Direction Handleometer (g) | 341.5 | 121.5 |
| Cross Direction Handleometer (g) | 78.5 | 57 |

TABLE VII

| Measurement | Example 7 Unwashed | Example 7 Washed |
|---|---|---|
| Basis Weight (g/m$^2$) | 167/9.2 | 202/9.5 |
| Thickness (mm) | 0.554/0.043 | 1.613/0.20 |
| Machine Direction Grab Strength (N) | 275/17 | 270/13 |
| Cross Direction Grab Strength (N) | 194/20 | 190/15 |
| Machine Direction Elongation (%) | 27.2/1.1 | 37.4/1.7 |
| Cross Direction Elongation (%) | 76.9/6.1 | 85.7/6.3 |
| Wetted Machine Direction Grab Strength (N) | 247/21 | 252/12 |
| Wetted Cross Direction Grab Strength (N) | 162/16 | 174/16 |
| Wetted Machine Direction Elongation (%) | 32.7/1.0 | 40.0/1.3 |
| Wetted Cross Direction Elongation (%) | 80.4/4.8 | 87.0/5.4 |
| Gravimetric Absorbency Test (%) | 276/13 | 495/15 |
| T50 Elapsed Time Absorbency Test (sec) | 6.4/0.6 | 4.2/0.4 |
| Absorbency Rate at T50 (g/g/sec) | 0.22/0.02 | 0.60/0.07 |
| Intrinsic Absorbency (%) | 414/9 | 694/10 |
| Wick Rate (sec) | 3.8/0.3 | 3.2/0.2 |
| Machine Direction Handleometer (g) | 146.5 | 83 |
| Cross Direction Handleometer (g) | 40 | 24 |

TABLE VIII

| Measurement | Example 8 Unwashed | Example 8 Washed |
|---|---|---|
| Basis Weight (g/m$^2$) | 167/9.2 | 202/9.5 |
| Thickness (mm) | 0.297/0.013 | 0.737/0.061 |
| Machine Direction Grab Strength (N) | 255/14 | 259/13 |
| Cross Direction Grab Strength (N) | 148/6.2 | 146/13 |
| Machine Direction Elongation (%) | 29.4/1.1 | 30.6/1.5 |
| Cross Direction Elongation (%) | 94.0/7.5 | 93.7/8.9 |
| Wetted Machine Direction Grab Strength (N) | 241/8.0 | 231/16 |
| Wetted Cross Direction Grab Strength (N) | 134/5.8 | 141/15 |
| Wetted Machine Direction Elongation (%) | 35.8/1.8 | 34.5/2.0 |
| Wetted Cross Direction Elongation (%) | 108/8 | 105/14 |
| Gravimetric Absorbency Test (%) | — | 421/— |
| T50 Elapsed Time Absorbency Test (seconds) | — | 4.3/— |
| Absorbency Rate at T50 (g/g/second) | — | 0.49/— |
| Intrinsic Absorbency (%) | — | 553/— |
| Wick Rate (seconds) | — | 4.8/— |
| Machine Direction Handleometer (g) | 41 | 29.5 |
| Cross Direction Handleometer (g) | 9 | 6.5 |

For purposes of comparison, Handleometer tests were run on a single layer of fabric used in Examples 1 and 2. Side by side presentations of the data are presented in Table VI to show the comparison. It should be noted that all the data presented in Table IX is normalized to account for basis weight.

TABLE IX

|  | Single Ply | Inventive Double Ply (after Three Washings) |
|---|---|---|
| 2.0 oz, 75/25 Lyocell/Acetate | 1.6/0.12 | 1.8/0.48 |
| 2.3 oz, 100% Lyocell | 3.0/0.33 | 2.6/1.1 |

Clearly, the inventive fabrics are of exceptionally comparable drapability to the underlying ordinary spunlaced fabrics, with the notable exception that one is very unlikely to be able to compare a single ply fabric after three washings as there would be little left that would be recognizable as a fabric.

There are further applications of the present technology. For example, there are shown examples above of composite fabrics having different fibers on one side versus the other. This is to show that different bases fabric can be used in the invention. The particular fabrics may be tailored such that they have very different properties that are compatible for a particular end use. In one envisioned end use, the composite fabric may be absorptive on one side (hydrophilic) while a barrier to liquids on the other side (hydrophobic). A composite fabric having such qualities may have particular utility in the medical gown and drape area or perhaps as protective apparel. Other possible combinations of base fabrics having different, contrasting or similar properties should be conceivable based on the foregoing disclosure.

A further application of the present invention is the creation of a single base layer fabric having durability. Although the base lay will clearly have adhesive at one surface of the fabric, it will have durability by virtue of the small, closely spaced discrete point of adhesive locking the fibers together and not allowing the fibers to disentangled in a washer as ordinary spunlaced fabrics. The process of making a single layer fabric would be essentially the same as making a composite fabric without the second layer. Perhaps a release paper or other film-like material may be positioned on the back side of the fabric that would be pealed off after the globules are formed and set. Alternatively, the pressure roll on the nip may be provided with release coating so as not to collect adhesive thereon.

The foregoing description and drawings were intended to explain and describe the invention so as to contribute to the public base of knowledge. In exchange for this contribution of knowledge and understanding, exclusive rights are sought and should be respected. The scope of such exclusive rights should not be limited or narrowed in any way by the particular details and preferred arrangements that may have been shown. Clearly, the scope of any patent rights granted on this application should be measured and determined by the claims that follow.

We claim:

1. A durable spunlace nonwoven fabric comprising a web of nonwoven fibers and a series of closely spaced, discrete globules of adhesive material enmeshed therein encompassing a plurality of fibers into each globule.

2. The fabric according to claim 1 wherein the spunlaced fabric is a needle punched spunlaced fabric.

3. A durable fabric comprising:
a first fabric layer comprised of fibers;
a second fabric layer comprising nonwoven fibers;
and a series of substantially discrete globules of adhesive material securing fibers in said first and second layers together such that globules encompass a majority of the periphery of some fibers which are at least one fiber thickness away from the first fabric.

4. The durable fabric according to claim 3 Wherein the second fabric layer is a spunlaced fabric.

5. A durable fabric sheet comprising:
a first fabric layer comprised of fibers;
a second fabric layer comprising fibers wherein at least some of the fibers have Z direction orientation in the fabric;
and a series of substantially discrete globules of adhesive material securing fibers in said first and second layers together such that some Z direction fibers in the second fabric layer have portions which are substantially surrounded by adhesive in some of the globules.

6. The durable fabric sheet according to claim 5 wherein said Z direction fibers extend substantially through the thickness of the fabric.

7. The durable fabric sheet according to claim 5 where said first fabric sheet is comprised of fibers having Z direction orientation extending substantially through the thickness of the fabric.

8. The durable fabric sheet according to claim 5 wherein the globules comprise thermoplastic polymer.

9. The durable fabric sheet according to claim 5 wherein the globules encompass fibers positioned away from the boundary between the first and second fabrics by at least one other fiber in the same fabric layer.

10. The durable fabric sheet according to claim 5 wherein the globules are less than two millimeters in diameter.

11. The durable fabric sheet according to claim 10 wherein the globules are spaced less than four millimeters from an adjacent globule.

12. The durable fabric sheet according to claim 5 wherein the first fabric layer is a woven fabric sheet.

13. The durable fabric sheet according to claim 5 wherein the first fabric layer is a knitted fabric sheet.

14. The durable fabric sheet according to claim 5 wherein the second fabric layer is a nonwoven hydroentangled fabric sheet.

15. The durable fabric sheet according to claim 14 wherein first fabric layer is a nonwoven hydroentangled fabric sheet.

16. The durable fabric sheet according to claim 15 wherein at least one fabric comprises polyester and the adhesive is a thermoplastic polymer.

17. A process of forming a durable fabric comprising the steps of:
providing a web of nonwoven fibers;
positioning adhesive material onto the web; and
activating the adhesive material to form closely spaced, discrete globules of adhesive material encompassing a plurality of fibers at each globule.

18. The process according to claim 17 wherein the step of activating comprises running the web with adhesive material through a heated nip.

19. A process of forming a durable fabric comprising the steps of:
providing a first layer of fabric comprised of fibers;
providing a second layer of nonwoven fabric comprising fibers;
positioning adhesive material onto one of the first or second layer;
overlying one layer of fabric over the other to form a sandwich with the adhesive material between the first and second layers; and
activating the adhesive material to form closely spaced discrete globules encompassing a plurality of fibers from each layer at each globule.

20. A process of forming a durable fabric comprising the steps of:

providing a first layer of fabric comprised of fibers;

providing a second layer of fabric comprising fibers wherein at least a portion of the fibers have a Z component orientation;

positioning adhesive material onto one of the first or second layer;

overlying one layer of fabric over the other to form a sandwich with the adhesive material between the first and second layers; and activating the adhesive material to form discrete globules encompassing fibers in each of said layers together such that portions of the Z component fibers are substantially surrounded by some of the globules.

21. The process according to claim 20 wherein the step of activating the adhesive material comprises heating.

22. The process according to claim 20 wherein the step of activating further comprises pressing the fabric layers together while the adhesive material is being heated.

23. The process according to claim 20 wherein the step of positioning adhesive material comprises laying a mesh comprising interconnected points of adhesive with fine portions connecting the points in a network.

24. The process according to claim 20 wherein the step of positioning adhesive material comprises depositing small drops of adhesive material on one layer.

25. The process according to claim 20 wherein the step of activating the adhesive material comprises running the sandwich through a heated calender to heat and compress the fabric layers into the melting adhesive material.

26. The process according to claim 25 further comprising preheating one of said fabric layers prior to the heated calender.

* * * * *